UNITED STATES PATENT OFFICE.

CARLO ROSSI, OF LEGNANO, ITALY.

PROCESS OF PRODUCTION OF POTASH-CONTAINING FERTILIZERS.

1,401,649.   Specification of Letters Patent.   Patented Dec. 27, 1921.

No Drawing. Original application filed April 24, 1919, Serial No. 292,486. Divided and this application filed July 15, 1921. Serial No. 485,034.

*To all whom it may concern:*

Be it known that I, CARLO ROSSI, subject of the King of Italy, resident of Legnano, in the Kingdom of Italy, have invented new and useful Improvements in the Process of Production of Potash-Containing Fertilizers, of which the following is a specification.

The object of the present invention is to enable the recovery of potash values from feldspar rocks or volcanic rocks or from potassiferous ores in such manner as to produce a fertilizer of high value which is not only potassiferous but which is also nitrogenous. The invention contemplates the treatment of potassiferous rocks or minerals generally, including feldspar, orthoclase, leucite, granite, volcanic ash, etc.

It is well known that if calcium carbid be heated in the presence of nitrogen, the carbid absorbs the nitrogen and is transformed into calcium cyanamid, carbon being simultaneously separated according to the equation:

$$CaC_2 + N_2 = CaCN_2 + C$$

The liberated carbon remains mingled with the calcium cyanamid and is entirely lost, since it serves no purpose as a manure, while a heavy expense has been incurred to fix this carbon to lime in the form of calcium carbid.

The applicant has found that if finely ground potassiferous rock be mingled with the calcium carbid and the mixture be heated in the presence of nitrogen exactly as in the well known process for the production of calcium cyanamid, and the temperature is held below the volatilizing temperature of the potash values a reaction takes place between the carbon set free by the production of calcium cyanamid, the free lime contained in the calcium carbid and the feldspar or potassiferous volcanic rock, nitrogen being absorbed and the potash values remaining in the resultant mixture, which mixture thus contains both potash and nitrogen values and can be advantageously employed as a fertilizer.

Having now described my invention and how the same is to be carried out, what I claim as my invention is:

The process of preparing valuable products from potassiferous minerals (leucite, volcanic ash, feldspar, orthoclase, granite, etc.) which comprises subjecting a mixture of such a mineral with calcium carbid to a reacting temperature in the presence of nitrogen, said temperature being below the volatilizing temperature of the potash values, and thereby obtaining a complex fertilizer which is both potassiferous and nitrogenous.

In testimony whereof I affix my signature.

CARLO ROSSI.